United States Patent [19]

Bloch et al.

[11] Patent Number: 5,520,578
[45] Date of Patent: May 28, 1996

[54] AIRCRAFT CABIN PRESSURE CONTROL SYSTEM

[75] Inventors: Alexander Bloch, Münzenberg; Hanns-Ulrich Ettl, Maintal; Peter Kuhn, Hanau, all of Germany

[73] Assignee: Nord-Micro Elektronik Feinmechanik AG, Frankfurt, Germany

[21] Appl. No.: 245,863

[22] Filed: May 19, 1994

[30] Foreign Application Priority Data

May 19, 1993 [DE] Germany ............... 43 16 886.8

[51] Int. Cl.$^6$ ................................................ B64D 13/04
[52] U.S. Cl. ..................................................... 454/74
[58] Field of Search ............................ 454/71, 72, 75

[56] References Cited

U.S. PATENT DOCUMENTS 3,373,675  3/1968  Best ........................... 454/74
3,375,771  4/1968  Balcom, Jr. ................. 454/74
4,553,474  11/1985 Wong et al. ................. 454/74
5,297,987  3/1994  Emmons et al. ............. 454/74

*Primary Examiner*—Harold Joyce
*Attorney, Agent, or Firm*—Herbert L. Lerner; Laurence A. Greenberg

[57] ABSTRACT

A cabin pressure control system for aircraft includes a controller for receiving and comparing set point and actual values for an aircraft cabin pressure. A speed-controlled drive for an air outlet valve is connected to the controller for triggering the valve as a function of the comparison. A remote indication is issued to the controller solely regarding a newly established actual cabin pressure, without a remote position indication from the valve.

10 Claims, 2 Drawing Sheets

AIRCRAFT CABIN PRESSURE CONTROL SYSTEM

BACKGROUND OF THE INVENTION

Field of the Invention

The invention relates to a cabin pressure control, adjustment or regulation system for aircraft, with a controller for a comparison of a command or set point value and an actual value of a cabin pressure, and triggering of an air outlet valve as a function of the comparison.

In such cabin pressure controls, it is usual to control the air inlet valve through a comparison of command or set point and actual values for the pressure prevailing in the cabin and of the cabin pressure expressed as a set point or command value which is dependent on the altitude of the aircraft. The air inlet valve control is typically performed at the rear of the aircraft, in such a way that a predetermined pressure reduction is achieved by means of the cabin air flowing out through the valve.

In earlier conventional cabin pressure control systems, after the comparison of command or set point and actual values was performed, the controller sent a certain signal to the electrical drive for the valve which was connected downstream. Then the valve issued a remote indication, checkback signal or acknowledgement of position, which was compared with the predetermined adjustment value, and readjustment was carried out as needed.

However, that kind of control with continuous remote indication of the valve position entails considerable expense and because of the great number of individual components, it is also more likely to malfunction.

SUMMARY OF THE INVENTION

It is accordingly an object of the invention to provide an aircraft cabin pressure control system, which overcomes the hereinafore-mentioned disadvantages of the heretofore-known devices of this general type, which is very much simpler in structure, which makes do with fewer components and which nevertheless can optimally control the pressure in the cabin.

With the foregoing and other objects in view there is provided, in accordance with the invention, a cabin pressure control system for aircraft, comprising a controller for receiving and comparing set point and actual values for an aircraft cabin pressure; an air outlet valve; a speed-controlled drive for the valve being connected to the controller for triggering the valve as a function of the comparison; and means for issuing a remote indication to the controller solely regarding a newly established actual cabin pressure, without a remote position indication from the valve.

This means that the drive of the valve is triggered by the main controller solely in a speed-controlled fashion, and a remote indication is issued solely about the changing cabin pressure. Thus, very reliable or safe control of the cabin pressure is made possible much more simply and with fewer components.

In accordance with another feature of the invention, the control signals are transferred from the controller to the drive through a digital data bus.

In accordance with a further feature of the invention, the digital data bus is constructed according to the Arinc-429 Standard.

In accordance with an added feature of the invention, the power supply to the drive is switched directly by the control logic, rather than directly at the drive as was previously usual.

In accordance with an additional feature of the invention, in order to economize on lines and to avoid interaction, information regarding the current state of the drive, and in particular error reports, results of self-tests, and the status of end switches, are issued, combined, through a data bus.

In accordance with yet another feature of the invention, in addition to the controlled drive, there is provided a manually triggerable drive motor for the valve.

In accordance with yet a further feature of the invention, in order to additionally secure and optimize the system, there are provided two controllers, each with one control channel and one drive for the common valve, which take on the triggering and control of the drive in alternation with one another as a function of external parameters.

In accordance with a concomitant feature of the invention, each controller is operatively connected to two separate valves, so as to enable a higher air throughput or exchange of air.

Other features which are considered as characteristic for the invention are set forth in the appended claims.

Although the invention is illustrated and described herein as embodied in an aircraft cabin pressure control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
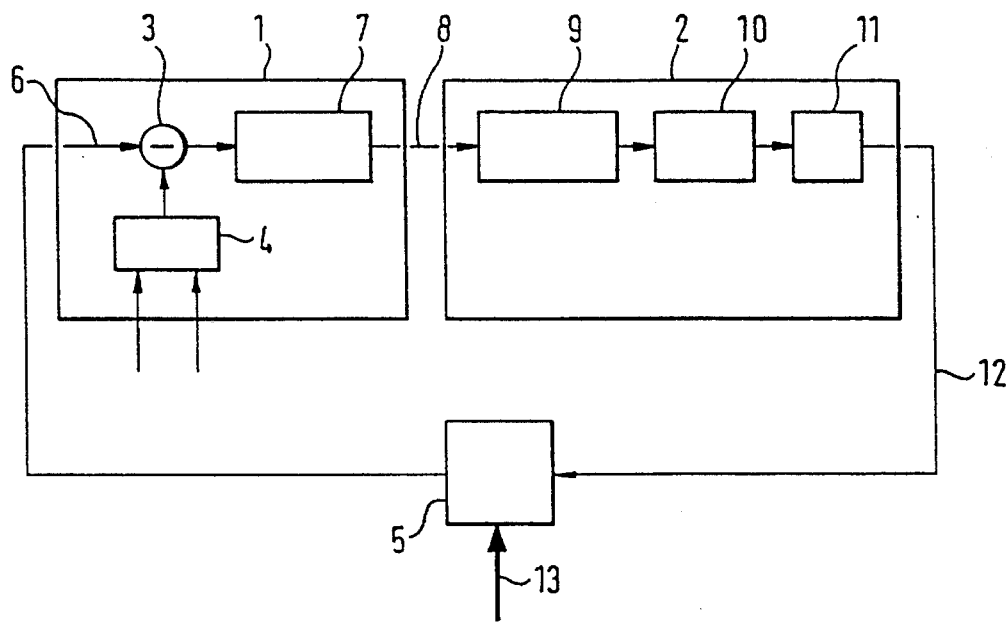
FIG. 1 is a basic schematic and block circuit diagram of a cabin pressure control.

Referring now to the figures of the drawing in detail and first, particularly, to FIG. 1 thereof, there is seen a basic circuit diagram in which a cabin pressure control system essentially includes an actual controller 1 and an electrical value drive unit 2. A comparison of command or set point and actual values, between a set point or command value for cabin pressure specified by a set point or command value transducer 4 and an actual value to be input from a cabin 5 and carried by a line 6, is performed in the actual controller part 1 in a differentiating member 3, and a difference between these values is delivered to an actual control logic 7.

The control signals are supplied to the valve drive unit 2 over a digital data bus 8 to be described below. The valve drive unit 2 firstly has a speed controller 9, from which the control signals are supplied to a drive or motor 10 and a transmission, so that finally an air outlet valve 11 is opened or closed more or less widely. The drive 10 is controlled solely in terms of speed. In other words, the actual control logic or controller 7 issues signals solely relating to the speed at which the drive of the valve opens or closes.

A remote indication, answer-back signal or acknowledgement of the function or action of the air outlet valve 11 is then issued over a line 12 solely concerning the changed pressure in the cabin 5 that is represented by the value carried by the line 6, which moreover is still dependent on incoming fresh air 13.

In other words, this means that the air outlet valve 11 is triggered in a solely speed-controlled manner, and a single remote indication to the controller 7 is issued concerning the changing actual value of the cabin pressure.

Figure 2:
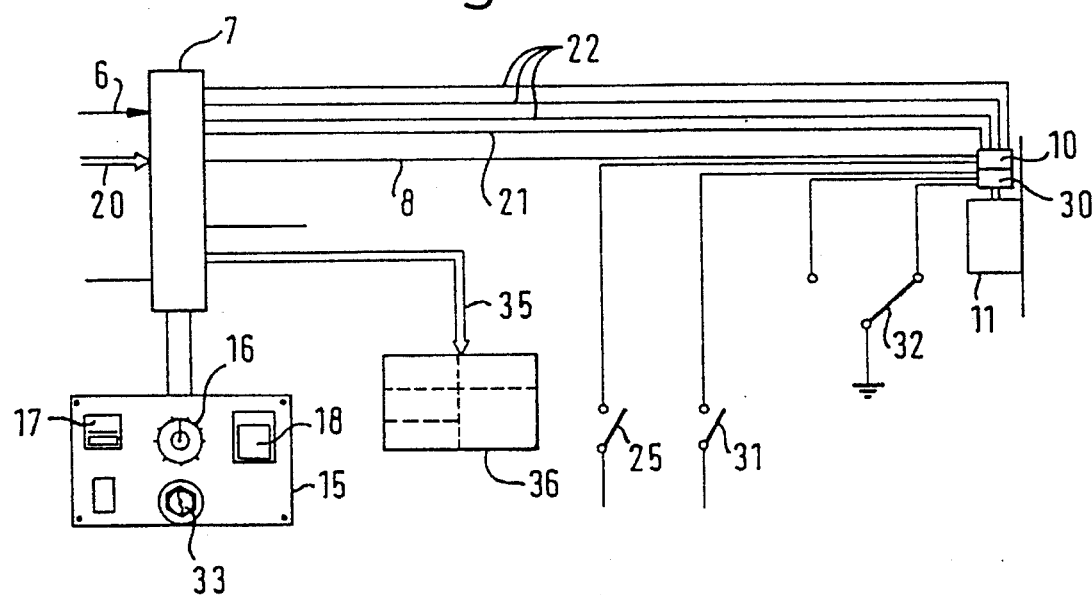
FIG. 2 is a schematic and block circuit diagram showing details of a drive control.

FIG. 2 shows a special principle for constructing a cabin pressure control system. A control panel 15, which is firstly connected to the actual controller 7, has a corresponding adjusting unit 16 for an applicable altitude of the runway because pressure conditions must be adjusted thereafter, a switch 17, an error indicator 19 with an optional manual switchover and a switch 18 for opening the outlet valve 11, as well as a safety valve 33 for emergencies.

In the same way as in the basic circuit diagram of FIG. 1, the cabin pressure carried over the line 6 and further values 20, for instance relating to the ambient pressure or separate status information, are input into the controller 7.

The corresponding control signals are then sent from the controller 7 to the drive 10, over the digital data bus 8, which is constructed according to the Arinc-429 Standard. At the same time, the power supply is switched directly by the controller 7, over a line 21, to the drive 10.

In the illustrated exemplary embodiment, return lines 22 are provided from the drive 10 to the controller 7 for status information. The results of self tests and the status of the final switches and of the pressure switch are transmitted over the lines 22. However, it is also possible and practical to combine these lines 22 and to have the remote indications made through a data bus.

The circuit diagram also shows a switch 25, with which the valve 11 is closed entirely, beginning from a certain altitude. Moreover, a manually triggerable drive motor 30 is provided in the speed-controlled drive 10. This motor 30 is actuated through the switch 17 or a switch 31 and can optionally be connected to an emergency power source. A switch 32 for the drive motor 30 is operatively connected with the switch 18 for opening and closing the valve 11.

A display 36 is also acted upon by the controller 7 over a line 35. The display 36 shows the applicable values relating to the cabin altitude, runway altitude, cabin pressure, and various other indications.

Naturally, it is also possible to construct the cabin pressure control system in a redundant fashion, in such a way that two controllers are provided, each of which act with one control channel and one drive upon the common valve. The two controllers take on the triggering and control of the drive in alternation, as a function of external parameters. However, such a circuit is not shown in detail in the drawing.

Figure 3:
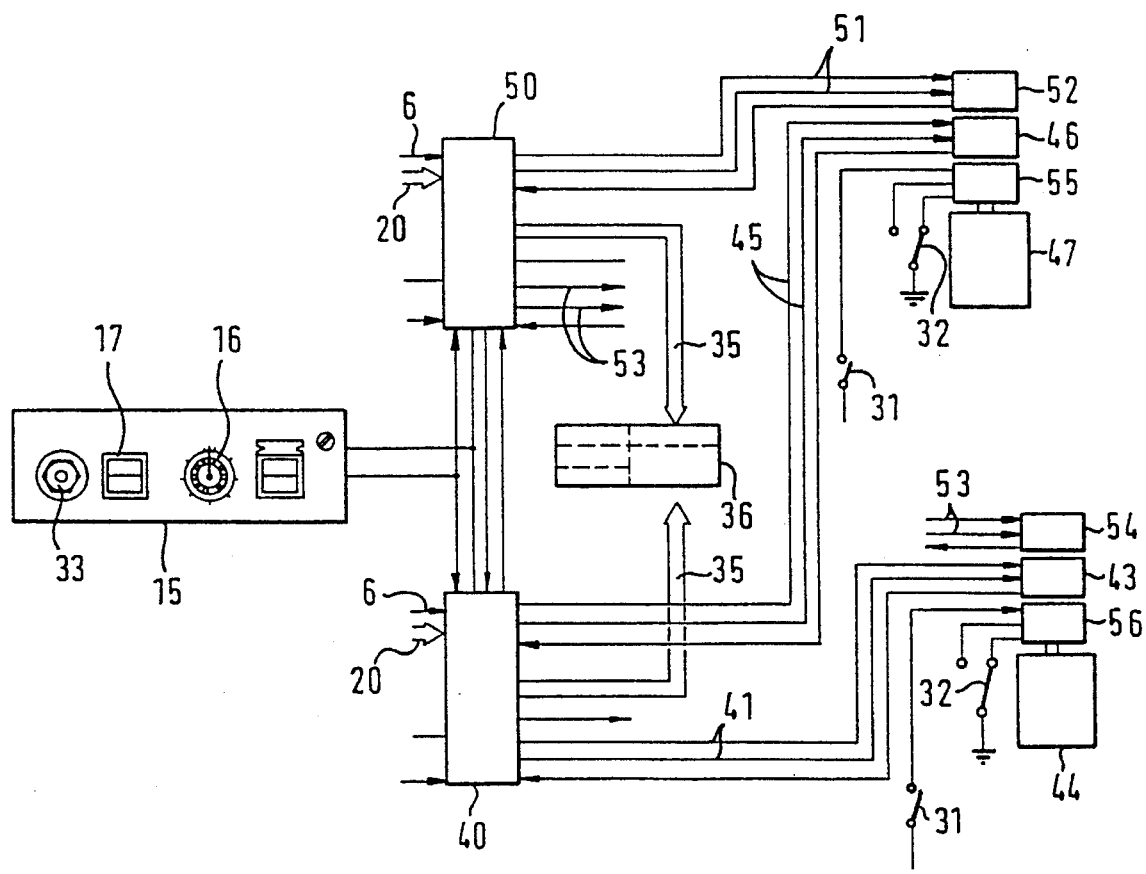
FIG. 3 is a schematic and block circuit diagram of an expanded circuit with two controllers and two valves.

By comparison, FIG. 3 shows a circuit in which even with a redundant construction, two controllers act upon two different drives, with two separate valves.

As can be seen from the drawing, a controller 40 acts over control lines 41, or a corresponding data bus, upon a drive 43 of a first valve 44. In the same way, control lines 45 lead from the controller 40 to a drive 46 of a second valve 47.

A parallel controller 50 acts over control lines 51, in the form of a data bus, upon a drive 52, which is likewise used for the valve 47, while a drive 54 for the valve 44 is adjusted over control lines 53.

In the same way, each of the valves 44 and 47 also has a respective manually actuatable valve 55 and 56 in this case. Analogously to the exemplary embodiment of FIG. 2, a control panel 15 is again provided, which is operatively connected to both controllers 40 and 50, and a display 36 that is connected to both controllers over the lines 35 in the same way is also provided. Once again, the two controllers 40 and 50 alternate with one another as a function of external parameters, in taking on the triggering and control of the respective drives 43 and 46, and 52 and 54. This kind of cabin pressure control system is practical especially for relatively large aircraft, in which one such air outlet valve 44 and 47 is provided in a forward portion and one in a rear portion of the aircraft.

The overall result is accordingly a cabin pressure control system that is constructed at reduced expense and yet operates as a function of predetermined control parameters to assure reliable and optionally redundant control of the cabin pressure as a function of the altitude of the aircraft.

We claim:

1. A cabin pressure control system for aircraft, comprising:

a controller for receiving and comparing set point and actual values for an aircraft cabin pressure;

an air outlet valve;

a speed-controlled drive for said valve being connected to said controller for triggering said valve as a function of the comparison; and said controller receiving a remote indication solely regarding a newly established actual cabin pressure, while a position of said valve is not reported to said controller.

2. The cabin pressure control system according to claim 1, including a digital data bus for transferring control signals from said controller to said drive.

3. The cabin pressure control system according to claim 1, wherein said controller is a control logic directly switching a power supply to said drive.

4. The cabin pressure control system according to claim 1, wherein said remote indication issuing means include a data bus for combining issued information regarding a current state of said drive.

5. The cabin pressure control system according to claim 4, wherein said issued information includes error reports.

6. The cabin pressure control system according to claim 4, wherein said issued information includes results of self-tests.

7. The cabin pressure control system according to claim 4, wherein said issued information includes a status of end switches.

8. The cabin pressure control system according to claim 1, including a manually controlled drive motor connected to said valve in addition to said controlled drive.

9. The cabin pressure control system according to claim 2, wherein said digital data bus is a control channel, and including another controller, another control channel and another drive for said valve, said controllers triggering and controlling said drives in alternation with one another as a function of external parameters.

10. The cabin pressure control system according to claim 2, wherein said digital data bus is a control channel, and including another controller, another control channel, another valve and another drive for said other valve, said controllers each triggering and controlling a respective one of said drives as a function of external parameters.

\* \* \* \* \*